E. ORTMAN.
AUTO SIGNAL.
APPLICATION FILED FEB. 7, 1920.
1,349,092. Patented Aug. 10, 1920.
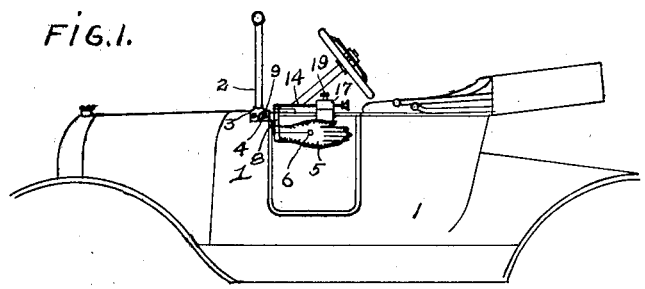
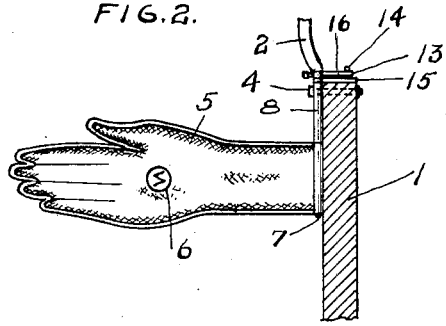
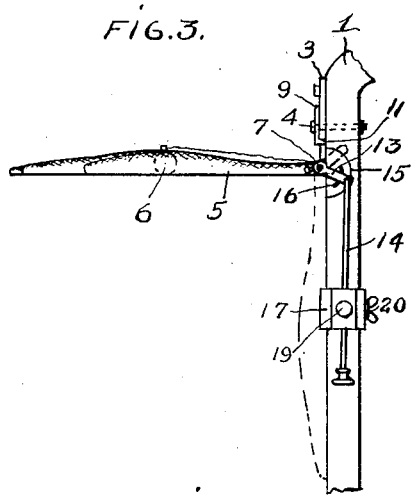
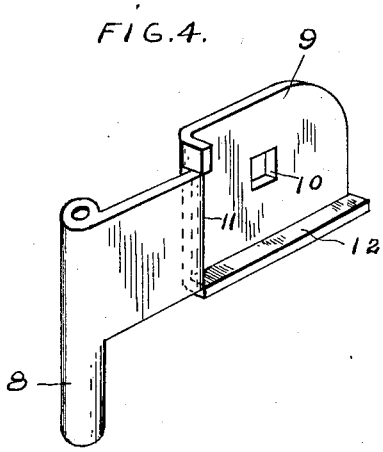
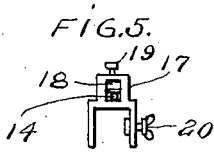
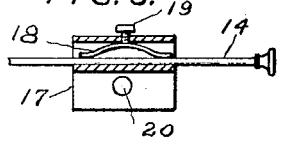
INVENTOR
ED ORTMAN
BY
Carey S. Frye
ATTORNEY

UNITED STATES PATENT OFFICE.

ED ORTMAN, OF KOKOMO, INDIANA.

AUTO-SIGNAL.

1,349,092.  Specification of Letters Patent.  Patented Aug. 10, 1920.

Application filed February 7, 1920. Serial No. 356,909.

*To all whom it may concern:*

Be it known that I, ED ORTMAN, a citizen of the United States, residing at Kokomo, Howard county, Indiana, have invented certain new and useful Improvements in Auto-Signals, of which the following is a specification.

This invention relates to auto signals of that class adapted to be secured to parts of an automobile and the main feature of the invention is the provision of a signal, preferably in the shape of a hand, adapted to be moved to a position substantially at right angles to the body of the car, to indicate to an approaching or trailing driver that a turn is to be made, or that a stop is to be made.

A further feature of the invention is in so shaping the hand as to render the same substantially hollow or cupped and in said cupped portion is placed a signal lamp so arranged that it will be illuminated when the hand is swung to signaling position and be cut out, when the hand is in inoperative position.

A further feature of the invention is the provision of means for swinging said hand in to or out of operative position from the interior of the car, and a further feature of the invention is the provision of means for holding the hand in its adjusted positions.

Other objects and advantages will be hereinafter more fully set forth and pointed out in the accompanying specification.

In the accompanying drawings which are made a part of this application,

Figure 1 is an elevation of a portion of an automobile with the signal attached thereon.

Fig. 2 is a sectional view through a part of an automobile body showing the signal in operative position.

Fig. 3 is a top plan view showing the signal in operative position by full lines and in inoperative position by dotted lines.

Fig. 4 is a perspective view of the supporting bracket for the signal.

Fig. 5 is an end elevation of the locking means for holding and adjusting said signal.

Fig. 6 is a sectional view thereof.

Referring to the drawings in which similar reference numerals designate corresponding parts throughout the several views, 1 indicates the body of a vehicle, in this instance, the body of a Ford automobile, 2 indicates the usual form of wind shield frame which terminates in a plate like member 3 and through this member and the adjacent portion of the body 1 are introduced bolts 4 for holding the frame on the body.

It is customary for the driver of a vehicle, especially automobiles, to give a signal when a turn is to be made or when stopping and these signals are usually made by extending the hand and arm beyond one side of the car, but when using a closed vehicle or when the side curtains are in use, it is practically impossible to give these signals.

To overcome these objectionable features and at the same time provide means for giving a signal under all conditions, a signal 5 is provided, which is preferably in the shape of a hand, said hand being hollowed out or curved so that a lamp 6 may be mounted in the hollow of the hand and illuminate the hand when it is operated to give a signal.

The signal 5 is mounted on a shaft 7, the upper end of said shaft passing through a sleeve 8 of a bracket 9, said bracket having an opening 10 therethrough through which passes one of the bolts 4 employed for securing the shield frame 2 to the body 1. The body of the bracket 9 is offset along one edge and the bottom thereof to form shoulders 11 and 12, respectively, said shoulders engaging one edge and the bottom of the member 3 and holding the bracket against twisting action. By attaching the bracket in this manner, it is not necessary to form extra bolt holes through the vehicle body so that the body will not be marred, should the signal attachment be removed.

Attached to the upper end of the shaft 7 is a lever 13, the free end of the lever having a rod 14 attached thereto by means of which the signal 5 is moved to inoperative position parallel with the vehicle body, or to operative position at right angles to the vehicle body and this rod is so positioned that the signal may be operated from the interior of the car, consequently rendering the signal operative with a closed car or with the side curtains up.

The lever 13 swings above a platform 15, which is attached in any suitable manner to the bracket 9 and in order to illuminate the lamp 6, when the hand 5 is moved to operative position or extinguish the lamp when the hand is moved to inoperative position, a terminal 16 is attached to the platform 15 in such manner that when the lever 13 is in inoperative position, it will be disengaged from the terminal 16, thus breaking the circuit to the lamp 6 and extinguishing the lamp, the lever 13 forming the other terminal to the lamp. Likewise, when the signal is swung to operative position, the lever 13 will move into engagement with the terminal 16 and complete the circuit to the lamp, said lamp remaining illuminated so long as the signal is extended.

In order to hold the signal 5 either in operative or inoperative position, the rod 14 is passed through a block 17 and in said block is positioned a spring 18, the ends of which direct pressure against the rod 14 and hold the rod against longitudinal movement until the rod is manually operated to shift the signal. The tension of the spring on the rod may be increased or decreased by a regulating screw 19.

The block 17 is secured to the body 1 by a clamping screw 20 which threads through one wall of the block and presses against the interposed portion of the body so that the block may be readily removed.

The invention claimed is:

1. The combination with a vehicle body having a wind shield support thereon, of a signal, means for suspending the signal from the wind shield support, a lever attached to the signal for moving said signal toward or from the side of the vehicle body, a rod attached to the free end of said lever, a block through which said rod passes, means for retarding the lengthwise movement of said rod, and means for removably clamping the block on parts of the vehicle body.

2. The combination with a vehicle body, of a signal pivotally mounted upon the body to swing in a horizontal plane, a lever attached to said signal, a rod attached to the free end of said lever, a block having an opening therethrough through which the rod passes, a tensioning spring in said opening for directing pressure against said rod for retarding its movement, and means for removably clamping the block on parts of the vehicle body.

3. The combination with a vehicle body, and a wind shield support thereon, of a signal, a bracket to which the signal is pivoted, means for securing said bracket to said wind shield support, shoulders on said bracket adapted to engage the edges of the support for holding the bracket against swinging movement, and means for moving said signal to position adjacent the face of said body or to a position at right angles to the face of the body.

4. The combination with a vehicle body, a wind shield support, and bolts for securing the support to the body, of a signal formed to represent a hand, a bracket to which the signal is pivoted, said bracket having an opening through which one of said bolts passes for securing the bracket to the support, and shoulders on said bracket for engagement with the edges of said support for holding the bracket stationary.

In testimony whereof I hereto affix my signature.

ED ORTMAN.